United States Patent [19]

Brogardh

[11] Patent Number: 4,559,643
[45] Date of Patent: Dec. 17, 1985

[54] OPTO-ELECTRONIC IMAGE PROCESSOR

[75] Inventor: Torgny Brogardh, Västerås, Sweden

[73] Assignee: Asea Aktiebolag, Västerås, Sweden

[21] Appl. No.: 434,557

[22] Filed: Oct. 15, 1982

[30] Foreign Application Priority Data

Oct. 19, 1981 [SE] Sweden ................ 8106174

[51] Int. Cl.$^4$ ............................................... G06K 9/00
[52] U.S. Cl. ....................... 382/1; 250/213 A; 382/32; 382/65
[58] Field of Search ................ 382/1, 58, 65, 32; 250/213 A, 331, 205; 340/781, 784, 794; 350/331 R, 332, 342, 353, 359

[56] References Cited

U.S. PATENT DOCUMENTS

| | | |
|---|---|---|
| 3,093,477 | 6/1963 | Triebwasser . |
| 3,248,552 | 4/1966 | Bryan ............................ 382/65 |
| 3,453,595 | 7/1969 | Barrekette et al. ............ 382/58 |
| 3,643,066 | 2/1972 | Coliz et al. .................... 235/456 |
| 4,270,046 | 5/1981 | Werking ......................... 250/205 |
| 4,272,157 | 6/1981 | Collins, Jr. et al. ........... 350/342 |

OTHER PUBLICATIONS

Applied Physics Letters 32, (Mar. 1978), 5, pp. 320–321, Garmire et al, "Incoherent Mirrorless Bistable Optical Devices".

*Primary Examiner*—Leo H. Boudreau
*Attorney, Agent, or Firm*—Watson, Cole, Grindle & Watson

[57] ABSTRACT

The invention relates to a device for processing optical information of light intensity and/or light polarization and/or phase position and/or spectral composition varying in one, two or three dimensions and possibly varying in time. The processing of the information is adapted to be carried out by electro-optical modulators, for example liquid crystals, and photo-detectors, for example photo-conductors, are electrically connected together with other components, such as resistors and optical filters, so as to obtain circuits with electro-optical feedback. The invention is characterized in that said circuits with electro-optical feedback are arranged to sense the absolute light intensity, etc., at spatially different points of the optical information.

15 Claims, 21 Drawing Figures

FIG. 7
FIG. 8
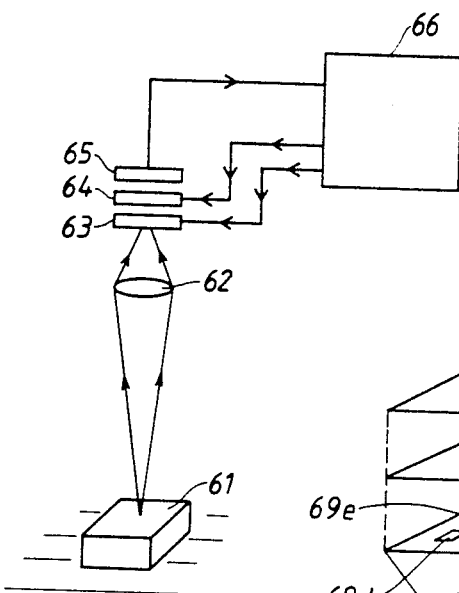
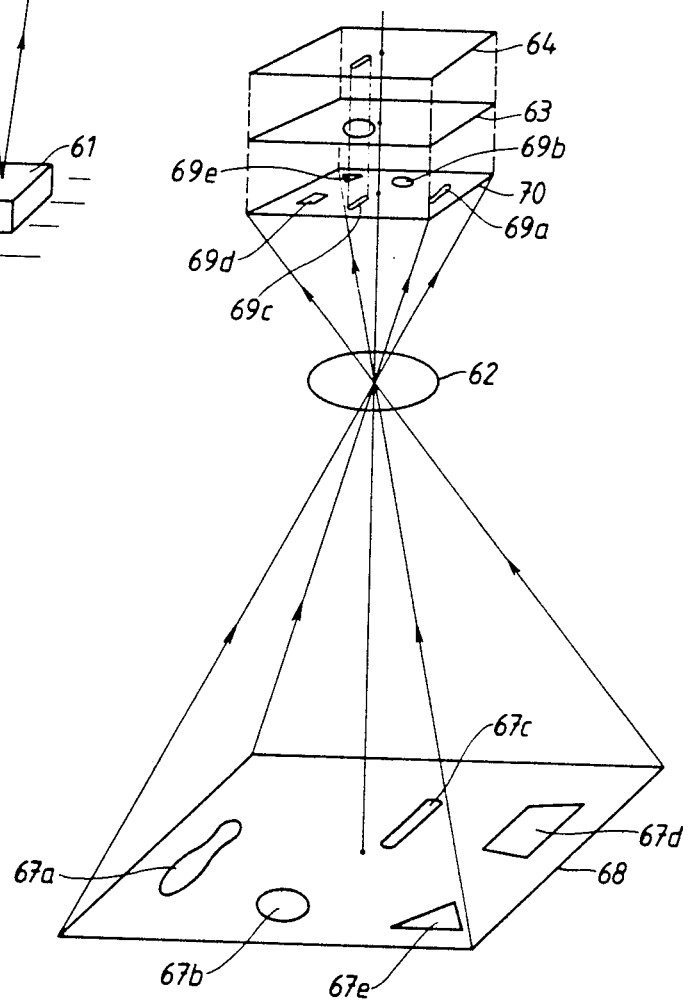

OPTO-ELECTRONIC IMAGE PROCESSOR

TECHNICAL FIELD

The present invention relates to a device for processing optical information.

DISCUSSION OF PRIOR ART

In industry there is a great potential need for image processing inter alia for inspection, control, materials handling and assembly. Different applications impose different demands on price and performance of the image processors, and therefore an increased supply of image processors having varying degrees of complexity may be expected to become available during the next few decades. These image processors in different price ranges and of different performance will be built up of a selection of basic components, such as CCD cameras, A/D converters, image memories, parallel processors for filtering, characterization and identification, data-base processors for reference handling, monitoring units for reference storage and interface for robots and super-ordinate production control systems. However, the price and performance of image processors may be radically changed by the introduction of optical processors, in which the built-in parallelism of the light provides new possibilities when processing complex information which exists in optical form in two dimensions.

A new type of two-dimensional circuits with electro-optical feedback has been described in the specification of U.S. patent application No. 363,598 filed Mar. 30, 1980 in the names of Adolfsson et al and assigned to the same assignee as this application, the entire contents of which are herein incorporated by reference. This invention describes a variant of the circuits for optical image processing featured in the specification of the aforementioned application while at the same time presenting examples of the image processing functions that can be performed with these circuits together with known electro-optical components. It should be noted that the processors in question are incoherent and thus insensitive to vibrations, temperature changes, etc., while at the same time normal camera optics can be employed for focusing the images towards the processors, which are typically made in monolithic form.

PROBLEMS OF IMAGE PROCESSING

Before describing the present invention, the degree of difficulty experienced with different types of processor applications will be discussed in order to give an indication of the possible fields of application of optical processing. The difficulties experienced during processing depend, on the one hand, on the degree of complexity of the scene and the object and, on the other hand, on its stochastics. Thus, an object having few details, high demands for tolerance, good and well-defined light conditions and a simple background, normally presents no image processing problem, whereas a simple object with few details and small stochastics against a complex background with large stochastics presents a considerably more difficult problem. In the following, examples are given of five different categories of image processing. Within each category, different demands apply to the processing, ranging from qualitative processing, as for example for identification purposes, to quantitative processing, as for example for determining position, orientation and/or dimension.

1. Complex details with small deviations against a simple background: Picking up or checking articles on a conveyor belt, on pallets or circular blanks; assembly of small articles on large objects; labelling, and so on.
2. Simple details with great stochastics against a simple background: Detection of material defects; checking the results of machining operations; cleaning or deburring; identifying simple details in transport hooks, and so on.
3. Simple details with great deviations against a complex background with high demands for tolerance: Checking printed circuit boards, drawings, patterned surface, cut-out sheet parts, castings or compression-molded products, mechanical surface treatment, mechanical assembly, and so on.
4. Simple details with great stochastics against a complex stochastic background: Quality control of timber, welding, and so on.
5. Complex details with small deviations against a complex stochastic background: Picking up an article from a disordered assembly of articles, for example in a basket.

BRIEF DESCRIPTION OF INVENTION

An optical processing device according to this invention, is principally suited for categories 1-3, but may also be used for special applications within categories 4 and 5. Thus, the device is designed for processing optical information of light intensity and/or light polarization and/or phase position and/or spectral composition varying in one, two or three dimensions and possibly in time, the processing of the information being adapted to be performed by electro-optical modulators as, for example, liquid crystals, and by photo-detectors, as, for example, photo-conductors. When these modulators and photo-detectors are electrically connected to other components, such as resistors and voltage sources, circuits with electro-optical feedback are obtained, in which circuits at least one optical modulator is present in the ray path between an optical source of information for processing the optical information and at least one photo-detector, and in which circuits at least one photo-detector is electrically feedback-coupled to at least one optical modulator. The invention is characterized in that said circuits with electro-optical feedback are adapted to be switched by the absolute value and/or the difference in intensity and/or polarization and/or phase position and/or spectral composition of the light in and between, respectively, spatially spaced-apart regions of an optical image, that said switching is adapted to take place between different light transmission states of said light modulator when said absolute value and/or difference reach pre-determined values, and that the light transmission states of the circuits with electro-optical feedback are adapted to be sensed optically with at least one photo-detector, separate from the electro-optical circuits, for example of the lateral photo-diode type.

The invention will now be more fully described by reference to a few circuits which provide electro-optical feedback for obtaining such image processor functions as slicing and gradient formation. Examples will be given of how an image processor may be composed of two-dimensional modulators and circuits with electro-optical feedback.

BRIEF DESCRIPTION OF THE DRAWINGS

The accompanying drawings show, in

DESCRIPTION OF PREFERRED EMBODIMENTS

Figure 1:
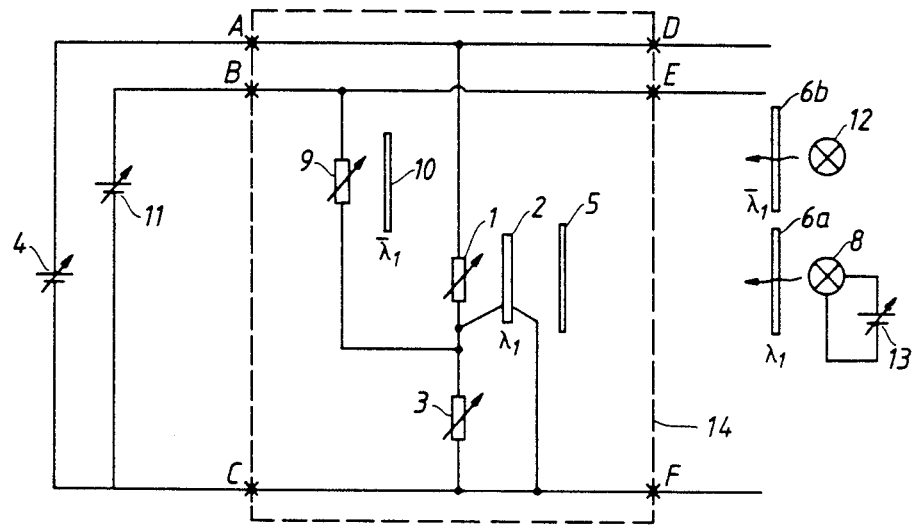
FIG. 1 a circuit with electro-optical feedback for slicing.

FIG. 1 shows a circuit with electro-optical feedback which consists of a photo-conductor 1, a resistor 3 and an optical modulator 2. As described in the specification of the afore-mentioned patent application, by a suitable selection of parameters a feedback coupling (light transmission of modulator→resistance of photo-conductor→modulator voltage) can be obtained with two stable states with different light transmission values of the modulator 2. The switching between the two stable states can be performed either electrically or optically, and the absolute value of the point at which switch-over occurs can be controlled by means of the light intensity or the voltage applied across the voltage divider (1, 3). As shown in FIG. 1, the modulator 2 is provided with an optical filter 5, which transmits light at the wavelength $\lambda_1$. This light emanates from a light source 8 which is provided with a filter 6a and which may be controlled by means of a voltage source 13. The circuit with electro-optical feedback (demarked by the dash line 14) is supplied by a voltage source 4, which can also be controlled, and the switching can be triggered by a photo-conductor 9, which is supplied from a separate voltage source for obtaining greater flexibility when adjusting the slicing level. The photo-conductor 9 is provided with a filter 10, which transmits light from an object to be measured (represented in FIG. 1 by a light source 12 and a filter 6b) but which does not transmit light from the light source 8. In this way the trigger function and the feedback function are isolated from each other on the basis of wavelength, and this results in a well-defined slicing.

Figure 2:
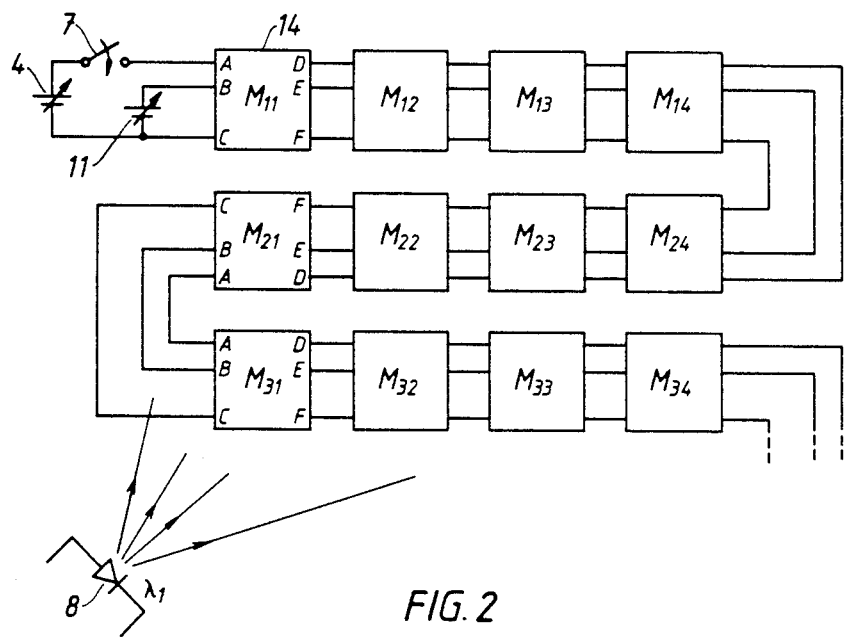
FIG. 2 how such circuits can be connected together in two dimensions for obtaining an optical slicing processor, FIGS. 3a and 3b the physical embodiment of the circuit of FIG. 1, FIGS. 4a to 4d a simple optical arrangement for the optical slicing processor of FIG. 2 and an example of the slicing function, FIG. 5 a circuit with electro-optical feedback for gradient formation, FIG. 6 a circuit with electro-optical feedback with direction-dependent gradient formation, FIG. 7 a schematic construction of a complete optical processor, FIG. 8 a somewhat more accurate picture of the optic portion of the processor, and FIGS. 9a to 9h and 9k a number of examples of image processor functions.

FIG. 2 shows how a number of circuits 14 according to FIG. 1 can be coupled together in a simple manner to obtain two-dimensional optical slicing. The level of slicing is regulated with the light source 8 and/or voltage sources 4 and/or 11. The task of the switch 7 is to return all the feedback circuits to their initial state, for example a state exhibiting low modulator transmission.

Figure 3A:
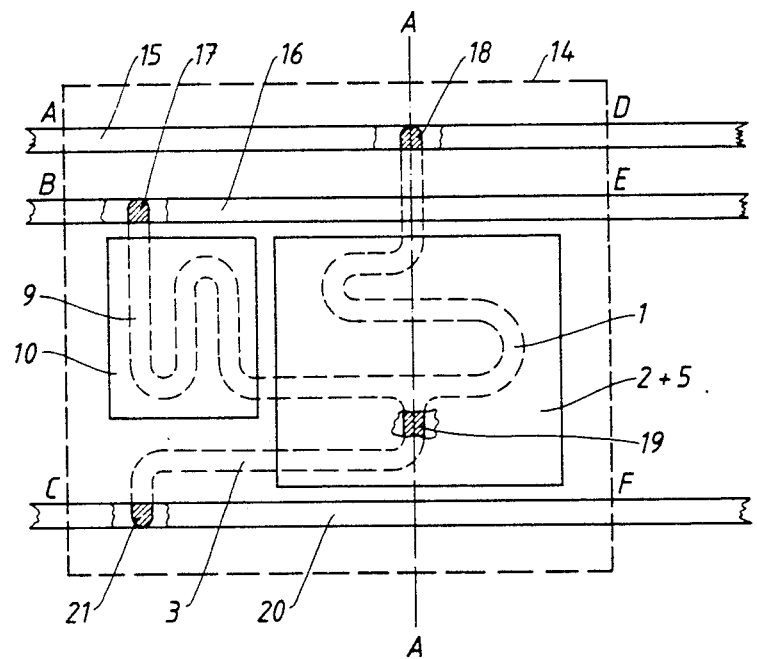
Figure 3B:
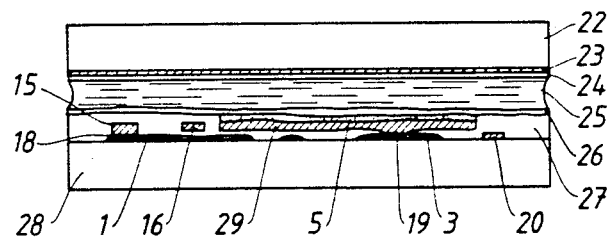

FIGS. 3a and 3b show one example of the physical arrangement in the circuit 14, FIG. 3a showing the circuit 14 perpendicular to its surface and FIG. 3b showing the circuit 14 along the section A—A of FIG. 3a. Numerals 15, 16 and 20 designate electrical conductors for feeding the photo-conductors 1 and 9 and the resistor 3. Numerals 17, 18 and 21 are galvanic contacts between the electrical conductors and the photo-conductors/the resistor, and numeral 19 is a galvanic contact between the photo-conductor 1 and one of the electrodes of the modulator 2. From FIG. 3b it is clear how the different components are placed on a substrate 28, which may consist of, for example, quartz or glass. Examples of other materials included in the circuit 14 are: a quartz or glass plate 22, a transparent metallic layer 23, a light-polarizing thin film 24, a liquid crystal 25, a light-polarizing thin film 26, an interference filter layer 5, a transparent metallic layer 29 and an electrically insulating layer 27. FIG. 3b also shows the electrical conductors 15, 16 and 20, the galvanic contacts 18 and 19, the photo-conductor 1 and the resistor 3, which may also be of photo-conductor type.

Figure 4A:
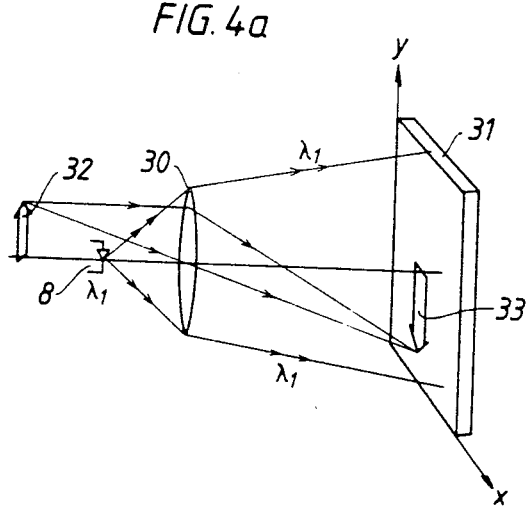
Figure 4B:
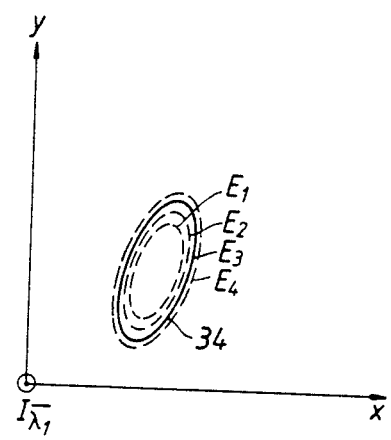
Figure 4C:
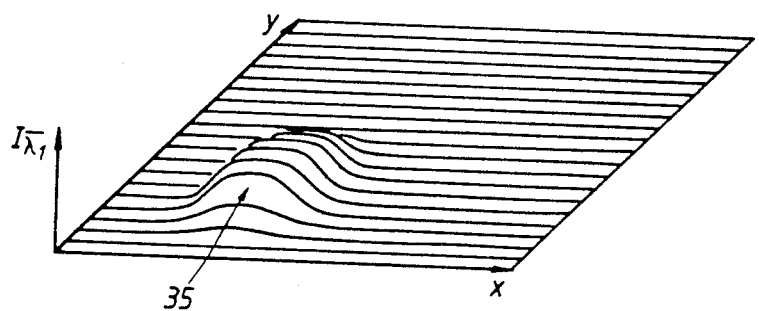
Figure 4D:
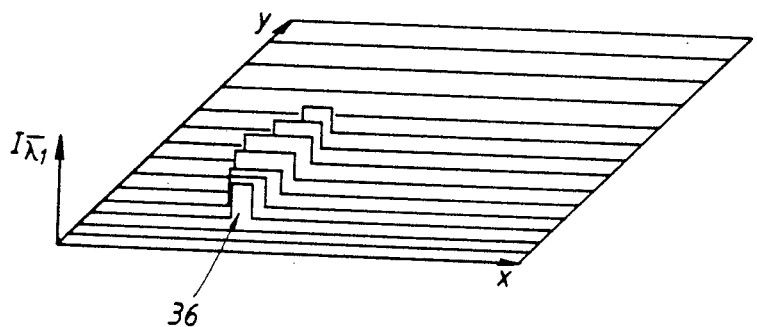

The principle of slicing is clear from FIGS. 4a to 4d. FIG. 4a shows how an image 33 of an object 32 is projected by a lens 30 on a slicing plate 31, which consists of a large number of circuits 14 with electro-optical feedback according to FIGS. 3a and 3b, connected together according to the arrangement shown in FIG. 2. The source 8 (e.g. a light-emitting diode (LED) or a laser diode) generates light of the wavelength $\lambda_1$ to illuminate the plate 31. FIG. 4b shows an example of how the image 33 on the plate 31 gives rise to a light intensity topography I$\lambda_1$ (where $\lambda_1$ corresponds to light which is not present at wavelength $\lambda_1$) characterized by level curves 34 (E$_1$–E$_4$). FIG. 4c gives a three-dimensional representation of this topography, and FIG. 4d shows the possible appearance of the resulting topography in wavelength $\lambda_1$. The size and shape of the sliced region 36 in FIG. 4d is determined by the size and shape of the region 35 (FIG. 4c), the intensity level at which slicing is performed and the magnitude of the light intensity gradients in the region 35. Thus, a measure of the magnitude of these gradients is obtained by conducting the slicing at more than one intensity level.

Figure 5:
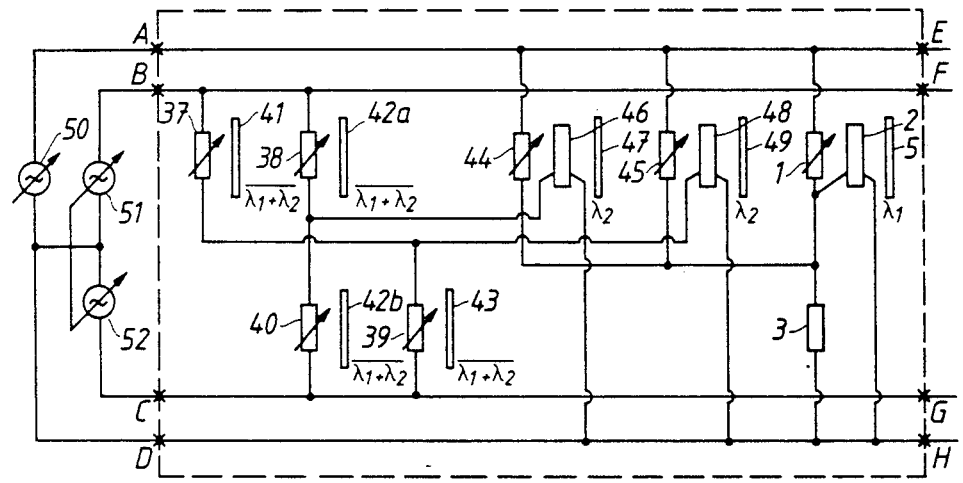
Figure 6:
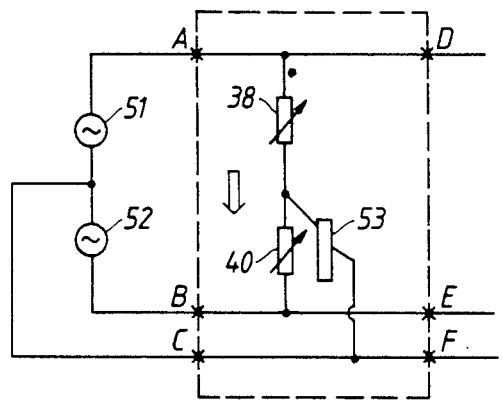

However, the magnitude of the intensity gradients may be obtained directly from the electro-optical feedback circuits 14 using the circuits shown in FIG. 5 and FIG. 6. In FIG. 5 the feedback loop (2→1→3) is found at the righthand side. The triggering of this loop is achieved with photo-resistors 44 and 45, which are controlled by modulators 46 and 48, respectively, which sense the bridge voltage in an electrical bridge consisting of photo-conductors 37, 38, 39 and 40. The bridge is fed separately from voltage sources 51 and 52, whereas the feedback circuit is fed from a voltage source 50. If the object reproduced on the processor gives rise to a light intensity gradient in some direction, the voltage across the modulator 46 and/or the modulator 48 will increase and the resistance of the photo-conductors 44 and/or 45 will decrease. If the gradient is sufficiently large, the modulator 2 will be triggered and acquire a high transmission value. To obtain high performance, the photo-conductor 1 operates at $\lambda_1$ (filter 5), the photo-conductors 44 and 45 operate at $\lambda_2$ (filters 47 and 49) and the photo-conductors 37–40 operate at wavelengths different from $\lambda_1$ and $\lambda_2$ (filters 41–43). There are, of course, a great number of possible couplings for obtaining gradient-forming processor functions using electro-optical feedback coupling. FIG. 6, for example, shows one very simple variant, which senses gradients in the direction of the arrow. In this case, both the feedback coupling and the gradient measurement are carried out with a circuit consisting of the photoconductors 38 and 40 and the optical modulator 53.

With the circuits described above and in the specification of the afore-mentioned patent application, and with conventional components such as lenses, photodiodes and microcomputers, a system according to FIG. 7 can be built up, in which 61 designates the object being viewed, 62 an object lens, 63 a two-dimentional optical modulator (according to any of the principles of the afore-mentioned patent application), 64 an optical processor (according to any of the principles of this invention), 65 a position-sensitive lateral photo-diode and 66 an electronic unit for the control of 63 and 64, feeding in measured values from 65 and other image data processing. The components 63, 64 and 65 can be packed into a sandwich structure with the following principal layers from top to bottom according to FIG. 7: Silicon, liquid crystal, quartz, liquid crystal and quartz. The intermediate electrode, photo-conductor and polarizator layers are described in the specification of the aforementioned patent application and in FIG. 3b of this specification.

The function of the modulator 63 will be clear from FIG. 8. An image of a scene 68 (comprising objects 67a-67e) is projected by a lens 62 onto an image plane 70, which defines a surface of a processor 64. With a modulator 63, an arbitrary part of the image on the plane 70 may be selected by making the transmission high in this arbitrary part. Thus, as shown in FIG. 8, an image 69c in the plane 70 of one object 67c in the scene 68 is transmitted on to the processor 64 for further optical processing, whereas the images 69a, 69b, 69d, 69e from the other objects have been blocked off by the modulator 63.

A few functions of the system of FIG. 7 will now be described when the modulator 63 is of the shift type (see the specification of the afore-mentioned patent application) and when the processor 64 is of the slicing type (see FIG. 1).

Figure 9A:
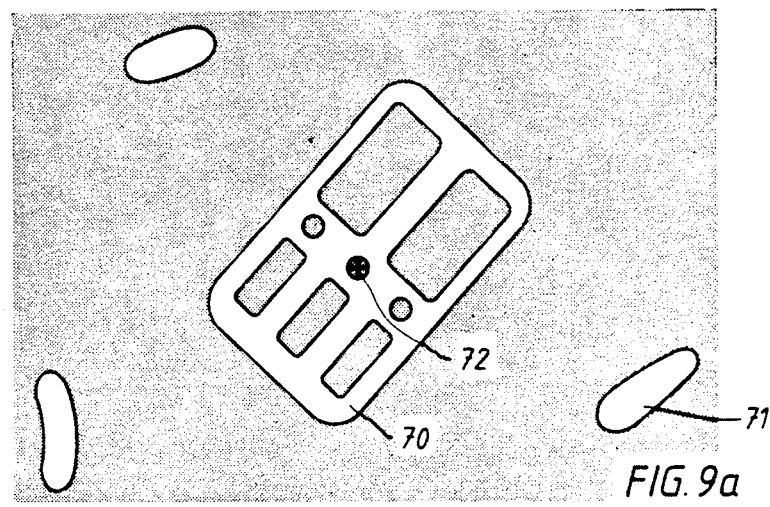

The description relates to a scene of category 1, i.e. a relatively complex detail against a simple background. FIG. 9a shows the image field with an object 70, which is to be identified, and image noise 71. The following processing steps are carried out:

1. The lateral photo-diode 65 measures the center of gravity 72 of the scene, which is done in a short time (<0.1 ms), since the photo-diode performs a parallel processing of all the image points in the scene (FIG. 9a).

Figure 9B:
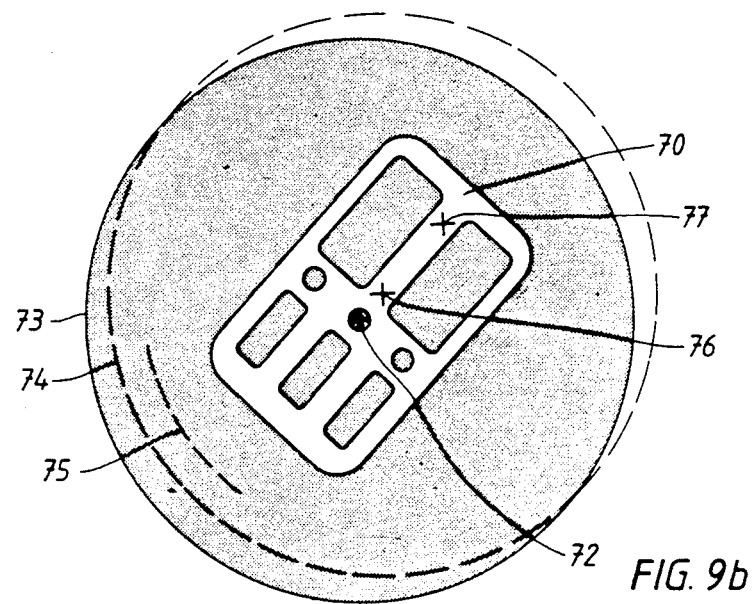

2. The electronic unit 66 shifts out a transparent region 74 with the center of gravity at the center of gravity 72 of the image (FIG. 9b). The time for this is about 0.1 ms (at 100×100 pixels, <1 μs switching time per circuit with electro-optical feedback). The radius of the circular region 73 is suitably determined by the operator during the reference storing; alternatively this can be done in several stages (see 3).

3. The photo-diode 65 measures the center of gravity of the section of the scene selected by and passed through the modulator 63, whereby the image noise from the other parts of the scene cannot influence the position of the center of gravity. This second measuring of the center of gravity is used in the following way as a reference point during the image processing. If the image processor is to operate with objects of different sizes, the operator can either select a radius of the region 73 which is certain to let through the picture of the largest object, or the processor itself may determine the radius by shifting the region 73 in the lateral direction, as illustrated in FIG. 9b, so that regions 74, 75. etc. with the centers of gravity 76, 77, etc. are passed. As long as the object 70 falls completely through the original region 73, the position of the center of gravity will not change when the region 73 is moved, but when the object 70 falls outside the region, as in the position corresponding to 75, a displacement of the center of gravity towards the center of the region is obtained. By shifting the region 73 in a few different directions in this way, the smallest size of the region can be determined. The processing for determining the size of the region is estimated, on an average, in about 0.5 ms. By measuring the dependence of the center of gravity on the position of the region 73, information about the shape of the object is obtained at the same time, which can be used directly for the identification. In addition to measuring the position of the center of gravity, the mean light intensity within the region selected by the modulator can also be measured, and if the processor 64 is activated, the center of gravity and the mean light for different slicing levels can also be measured. In summary, according to points 1-3 the following optical processing can be carried out during a time of less than 1 ms:

calculation of the center of gravity and the mean light of the scene at different levels of slicing calculation of the center of gravity and the mean light for a number of partial regions of the scene at different levels of slicing, whereby partial regions can be selected adaptively for obtaining maximum information about the size, shape and gross structure of the object.

Figure 9C:
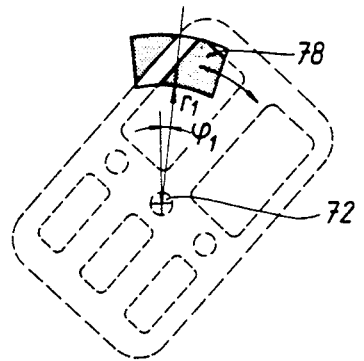

4. Also parts of the objects can be studied in detail in the manner illustrated in FIGS. 9c-9f as follows:

FIG. 9c: The center of gravity and mean light of the scene are calculated for a segment 78, which is shifted around the center of gravity 72 by means of the modulator. With this processing procedure the orientation and fine structure of the object can be determined. By slicing, the positions of the gradients can be determined.

Figure 9D:
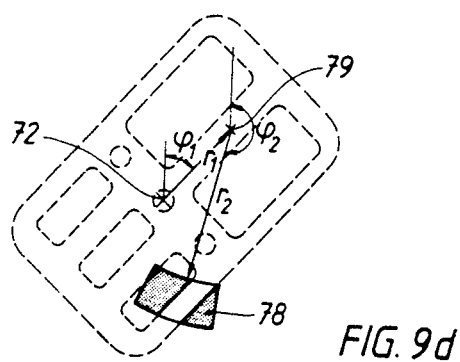

FIG. 9d: The procedure is similar to that shown in FIG. 9c but with the difference that the center of the movement of the segment 78 is displaced in relation to the center of gravity of the object, whereby, among other things, the surroundings of the objects can be studied, which is necessary if the object is to be identified against a complex background (e.g. when searching among disordered articles).

Figure 9E:
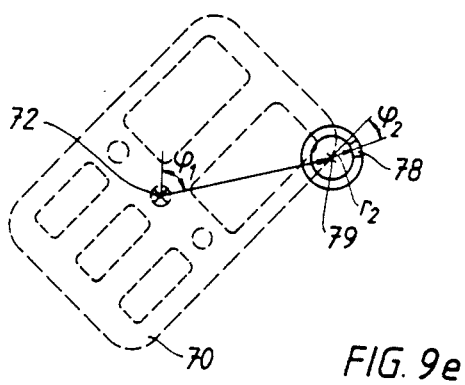

FIG. 9e: The procedure is similar to that shown in FIG. 9d but with the difference that the radius of movement $r_2$ of the segment 78 is selected to be sufficiently small for a detailed study of some area of the object 70.

Figure 9F:
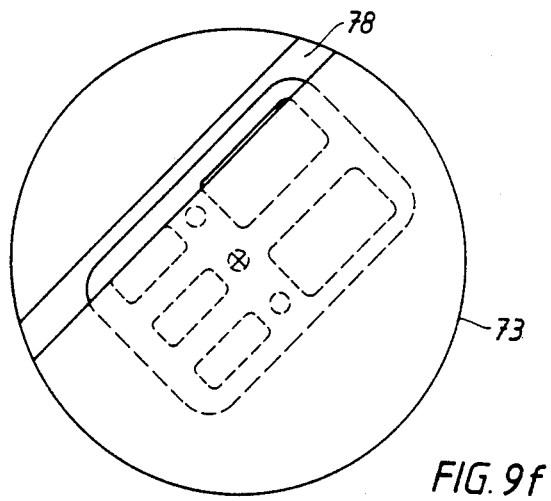

FIG. 9f: The segment 78 is selected in the form of a band within the region 73 for detailed studies of straight line segments of the object.

Figure 9G:
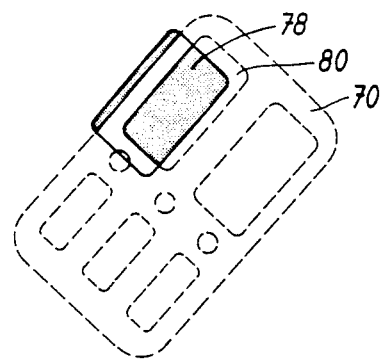

FIG. 9g: The segment 78 is given the same shape as a detail of the object (the rectangle 80 in the Figure) and is shifted relative to the corresponding detail for exact determination of its position and deviation in shape.

Figure 9H:
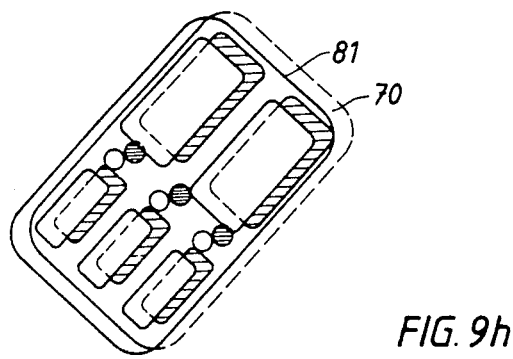

FIG. 9h: The segment 78 is formed as composite regions 81, which correspond to the shape of the object 70 for correlation against the whole object for accurate measurement of position and orientation. For scaling and coarse orientation of the pattern 70, the information from an earlier processing step is used, for example according to FIGS. 9c and 9d.

Figure 9K:
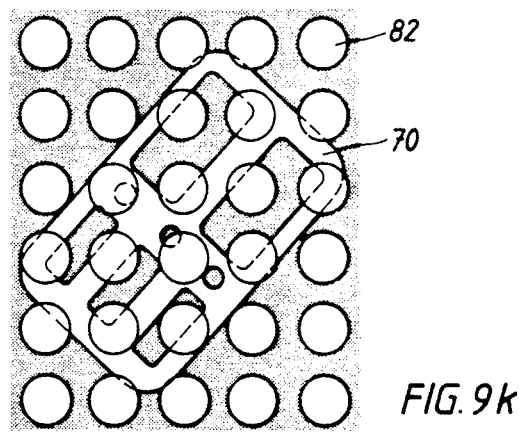

FIG. 9k: Periodic patterns 82 with different spatial frequencies are shifted into the modulator, whereby the photo-diode current gives the correlation between the laid-in spatial frequency and the structure of the object, which directly gives the spatial frequency spectrum of the object. If the spatial frequency spectrum in a certain direction of the object is desired, bands with varying spatial frequencies are shifted into the modulator. By applying the periodic pattern across part of the object only, the spatial frequency spectrum of details may be obtained.

In summary it can be said that with the help of the modulator, the object can be correlated against different patterns which contain different amounts of a priori data about the object. With little a priori data a rough estimation is obtained about the properties of the object, whereas with such a priori data more careful estimates can be made. For rapid processing, the most decisive a priori information for a given time of execution should be utilized for each processing stage, and this requires a processing strategy. Automating the strategy choice is a very difficult problem, so instead the strategy should be determined by the operator during the reference storage. In that way the operator will be able to test different types of processing stages for a rapid extraction of the significant information.

The invention described in the foregoing can be varied in many ways within the scope of the following claims.

What is claimed is:

1. A device for receiving and processing optical information, varying at least in at least one dimension, the processing being adapted to be carried out by at least one electro-optical modulator means, and photo-detector means, said modulator means and said photo-detector means being electrically connected together with other components to obtain circuits with electro-optical feedback in which at least one of said optical modulator means is present in the ray path between an optical source of information and at least one of said photo-detector means, and wherein said optical modulator means is present for processing the optical information and in which at least said one photo-detector means is electo-optically feedback-coupled to at least said one optical modulator means, said circuits with electro-optical feedback are adapted to be switched by optical sensing of a property of the light in and between, respectively, spatially separated regions of an optical image, said switching being adapted to be carried out between different light transmission states of said one light modulator means when said sensed property of the light reaches predetermined values, and that the light transmission states of said circuits with electro-optical feedback are adapted to be sensed optically with at least one other of said at least one photo-detector means, said one other photo-detector means being separated from the electro-optical circuits.

2. A device according to claim 1, further comprising screening circuits with electro-optical feedback for selectively screening-off selected regions of an image before the image impinges on a plate for image processing, said plate comprising an array of processing circuits with electro-optical feedback.

3. A device according to claim 2, in which said screening circuits with electro-optical feedback are interconnected to form at least one two-dimensional parallel shift register for laterally shifting the information on the screening circuit in different directions, an electronic unit for controlling said shift registers, at least one position-sensitive lateral photo-detector, being positioned in the ray path beyond the screening circuits, and the array of processing circuits measuring the center of gravity and/or total light of the processed image.

4. A device according to claim 1, in which said circuits with electro-optical feedback include at least one photo-resistor connected in series with at least one other resistor and a voltage source, the electrodes of said one optical modulator means being connected across one of the resistors so that said electro-optical feedback circuits can be triggered between stable states with respectively high and low light transmission, at least one photo-resistor in said electro-optical feedback circuits being used for sensing the optical information.

5. A device according to claim 4, in which the light intensity dependence of the transition state of said electro-optical feedback circuits is utilized for lateral intensity slicing of the optical information.

6. A device according to claim 4, in which said electro-optical feedback circuits are provided with optical filters, so that the sensitivity of said circuits to the optical information is less than to light from a separate light source.

7. A device according to claim 4, in which the optical information is sensed by at least one photo-conductor conected between one of the electrodes of said one modulators means, included in said electro-optical feedback circuits, and at least one voltage source.

8. A device according to claim 4, in which the optical information is sensed by at least one photo-conductor, included in a voltage divider, and that the voltage from said voltage divider is supplied to at least one electro-optical modulator which modulates the light to at least one photo-conductor connected to said electro-optical feedback circuits for triggering the same.

9. A device according to claim 8, in which said one electro-optical modulator includes at least one optical filter so that said one photo-conductor receives lower sensitivity to the optical information than to light from a separate light source.

10. A device according to claim 4, in which the optical information is sensed by photo-conductors connected in an electrical bridge which is supplied by at least one AC voltage source and the bridge voltage of which is connected to said electro-optical feedback circuits for triggering the same.

11. A device according to claim 4, in which said light properties for triggering said circuits with electro-optical feedback are determined be at least one of (a) the light intensity from a separate light source, (b) the voltage across said electro-optical feedback circuits and (c) the voltage to said separate photo-resistors.

12. A device according to claim 4, in which said photo-resistors in the circuit with electro-optical feedback and said photo-resistors used for sensing the optical information are supplied by at least two-series-connected voltage sources, the center taps of which are connected to one of the electrodes of said one electro-optical modulator means.

13. A device according to claim 1, in which said electro-optical feedback circuits are utilized as electro-optical memory elements, whereby said optical image regions, which reach a certain light level and/or difference in light level and/or which fulfill said mathematical relationships, can be maintained also when the image has been removed, whereby a correlation can be performed with an image falling towards the memory elements at a later stage, said image being generated in the same and/or in a different wavelength range.

14. A device according to claim 13, in which said correlation is carried out with an integrated photodetector across the image field.

15. A device according to claim 14, in which said correlation is carried out between two or more multiplexed images falling towards said memory element.

* * * * *